(12) United States Patent
Lyon

(10) Patent No.: US 7,474,592 B2
(45) Date of Patent: Jan. 6, 2009

(54) SECURE OPERATION OF A VERSATILE DEVICE BASED ON WHETHER AN AUTHENTICATED USER CONTINUES TO WEAR THE VERSATILE DEVICE AFTER INITIATING ITS USE

(75) Inventor: Geoffrey Martin Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 10/011,925

(22) Filed: Dec. 5, 2001

(65) Prior Publication Data

US 2003/0103414 A1  Jun. 5, 2003

(51) Int. Cl.
*G04B 47/00* (2006.01)
(52) U.S. Cl. ........................................... 368/10
(58) Field of Classification Search ............... 368/10, 368/46, 47, 51, 69, 224, 278, 281, 282, 327
See application file for complete search history.

(56) References Cited

U.S. PATENT DOCUMENTS

| | | | | |
|---|---|---|---|---|
| 4,736,196 A | | 4/1988 | McMahon et al. | |
| 5,537,102 A | * | 7/1996 | Pinnow | 340/5.8 |
| 5,883,576 A | * | 3/1999 | De La Huerga | 340/573.1 |
| 5,936,530 A | * | 8/1999 | Meinhold | 340/573.1 |
| 6,158,884 A | * | 12/2000 | Lebby et al. | 368/282 |
| 6,255,951 B1 | | 7/2001 | De La Huerga | |
| 6,350,055 B1 | * | 2/2002 | Barras | 368/281 |
| 6,396,403 B1 | * | 5/2002 | Haner | 340/573.4 |
| 6,431,455 B1 | * | 8/2002 | Ponert | 235/492 |
| 7,133,843 B2 | * | 11/2006 | Hansmann et al. | 705/41 |
| 2003/0099459 A1 | * | 5/2003 | Yanagita et al. | 386/52 |

FOREIGN PATENT DOCUMENTS

| | | |
|---|---|---|
| EP | 0295985 | 5/1988 |
| EP | 0774737 | 5/1997 |
| EP | 01014231 | 6/2000 |
| WO | WO 88/09541 | * 12/1988 |
| WO | WO 98/12670 | 3/1998 |
| WO | WO 00/05686 | 2/2000 |
| WO | WO 01/18332 | 3/2001 |

* cited by examiner

*Primary Examiner*—Edwin A. Leon
*Assistant Examiner*—Thanh S Phan

(57) ABSTRACT

A method and versatile device for use-based context security is described. In an embodiment, the versatile device is implemented as a wristwatch. The wristwatch is configured to facilitate a wireless transaction for an authenticated user and is configured to be worn by the authenticated user such that to encircle a part of the authenticated user. Moreover, the wristwatch includes a validation mechanism for controlling use of the wristwatch based on whether the authenticated user continues to wear the wristwatch after initiating use of the wristwatch.

20 Claims, 9 Drawing Sheets

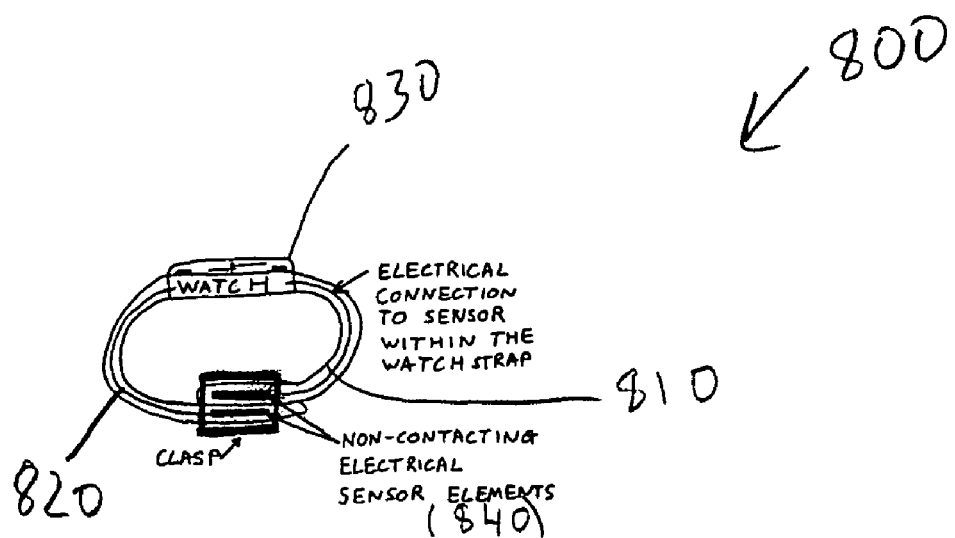

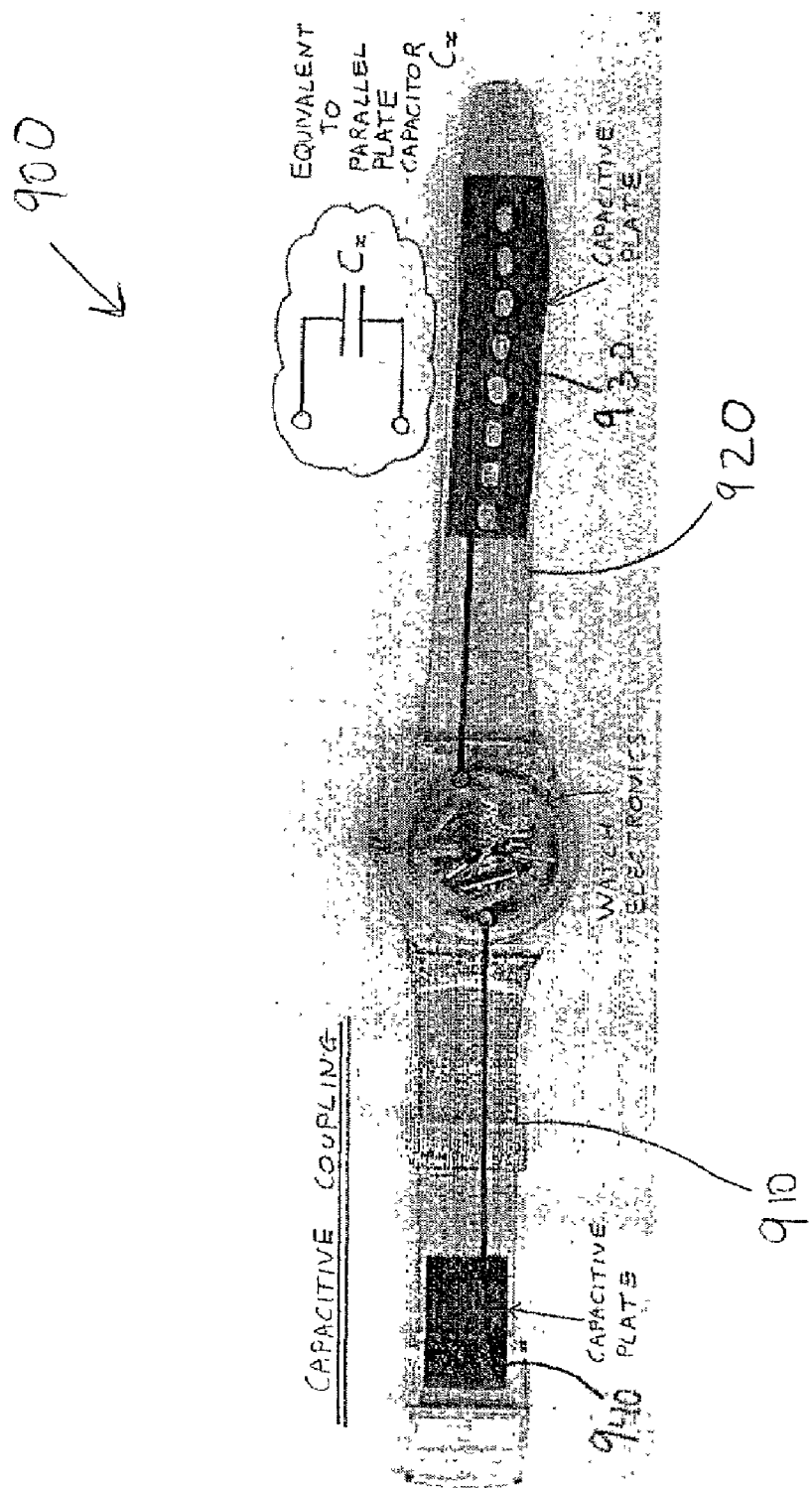

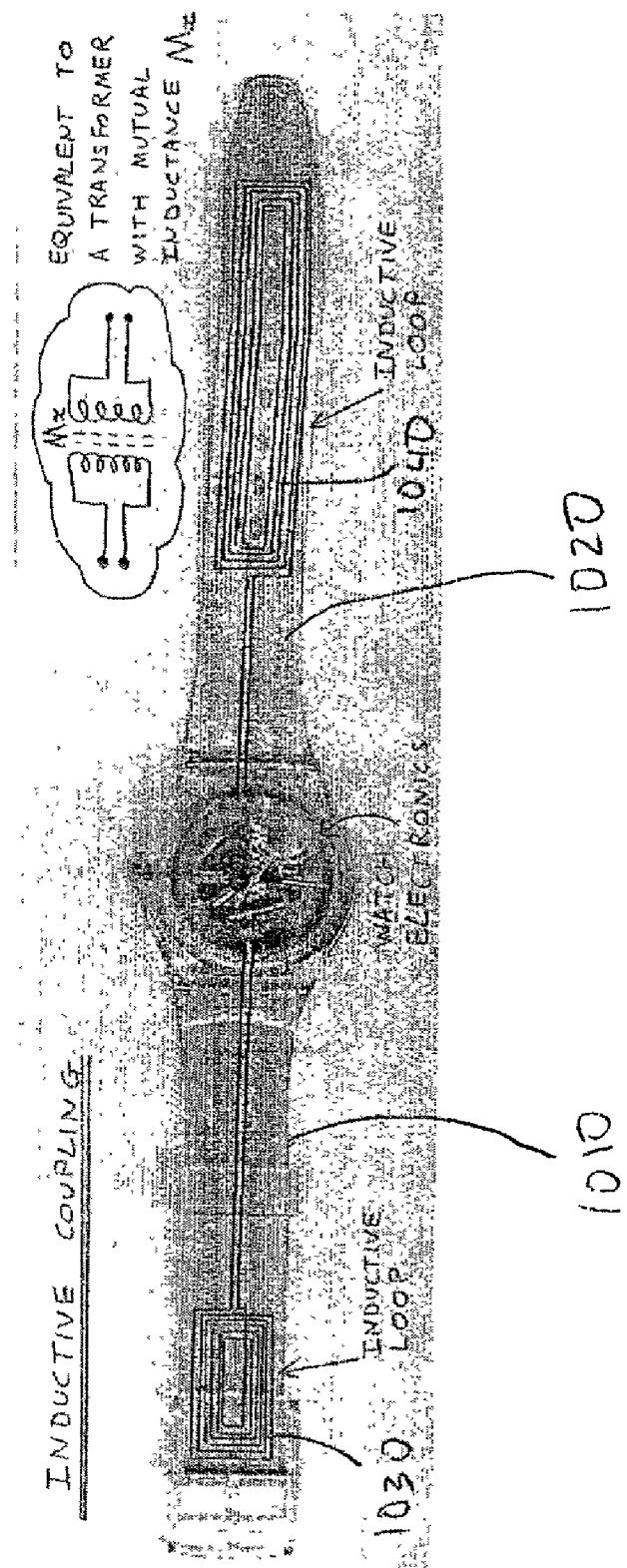

SECURE OPERATION OF A VERSATILE DEVICE BASED ON WHETHER AN AUTHENTICATED USER CONTINUES TO WEAR THE VERSATILE DEVICE AFTER INITIATING ITS USE

BACKGROUND OF THE INVENTION

1. Field of the Invention

The present invention generally relates to devices facilitating wireless transactions. More particularly, the present invention relates to secure operation of a versatile device based on whether an authenticated user continues to wear the versatile device after initiating its use.

2. Related Art

Currently, there are a number of devices configured to facilitate a wireless transaction for an authenticated user. The wireless transaction can be of any type (e.g., credit card type, debit card type, access control type, etc.). Some of these devices can be comfortably worn by the authenticated user because the device is implemented as a wristwatch. This wristwatch typically executes an authentication mechanism for identifying the user and utilizes a mechanism for data transfer over short-range wireless radio or transponder data links. Such wristwatches are primarily used in access control applications such as a ski lift pass. Although these wristwatches provide a good authentication mechanism for identifying the user and subsequent access to a variety of services, possession of the wristwatch is the only form of authorization required. Consequently, unauthorized use of a pre-registered (i.e., where a user has been authenticated) wristwatch is often difficult to prevent.

In addition to wristwatches, a large number of payment devices (e.g. credit cards) rely on simple security methods, where possession is the principle form of user authentication. More intelligent smart card style payment devices offer increased levels of security in terms of their stored data and transaction interaction, but still only offer security based on user association or ownership of the intelligent smart card style payment devices and offer no increased protection in terms of use-based context security. In the majority of cases, a lost or stolen card is vulnerable to misuse by others.

What is needed is a versatile device that implements a use-based context security scheme.

SUMMARY OF THE INVENTION

A method and versatile device for use-based context security is described and provided. In an embodiment, the versatile device is implemented as a wristwatch. The wristwatch is configured to facilitate a wireless transaction for an authenticated user and is configured to be worn by the authenticated user such that to encircle a part of the authenticated user. The wireless transaction can be of any type (e.g., credit card type, debit card type, access control type, etc.). Moreover, the wristwatch includes a validation mechanism for controlling use of the wristwatch based on whether the authenticated user continues to wear the wristwatch after initiating use of the wristwatch.

In particular, the wristwatch executes a context security validation scheme, where authenticated use is determined not only by possession of the wristwatch, but also by its operational context. The operational context will allow the wristwatch to accept or deny any external service interaction via a wireless link, based on whether the wristwatch is in an active/secure status state or in an inactive state. Moreover, the integration of a data channel within the straps of the wristwatch itself enables validation of whether the wristwatch is being worn by the authenticated user that initiated use of the wristwatch. Removal of the wristwatch will invalidate its context security and place the watch in an inactive state, disabling all external interaction via a wireless link.

The context security validation executed by the wristwatch enables valid user authentication and access to services or transactions via a wireless link, which may otherwise be obtained by non-authenticated individuals who obtained the wristwatch by devious means or by accident.

The concept of a secure device state provides additional security and theft redundancy as the wristwatch acts as a host for applications and secure data and no longer solely depends on possession to maintain security. The security is obtained by a combination of the authenticated user wearing the wristwatch and initializing its operation. Therefore, removing the wristwatch will also disable its operational capabilities, thus reducing its value to others.

These and other advantages of the present invention will no doubt become apparent to those of ordinary skill in the art after having read the following detailed description of the preferred embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 8 illustrates a wristwatch in accordance with another embodiment of the present invention, showing a non-contacting electrical data channel.

FIG. 9 illustrates a wristwatch in accordance with another embodiment of the present invention, showing a non-contacting electrical data channel formed by capacitive coupling.

FIG. 10 illustrates a wristwatch in accordance with another embodiment of the present invention, showing a non-contacting electrical data channel formed by inductive coupling.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
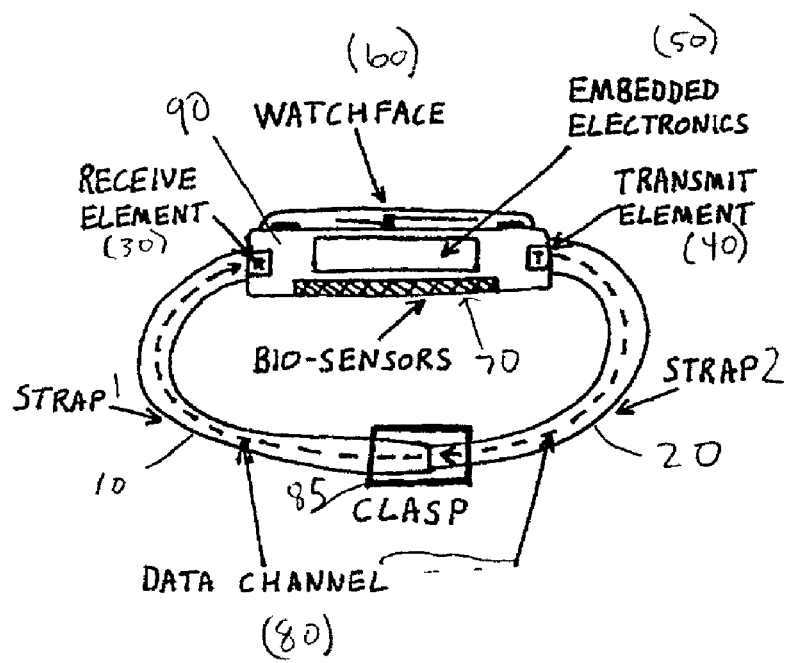
FIG. 1 illustrates a wristwatch in accordance with an embodiment of the present invention.

FIG. 1 illustrates a wristwatch 100 in accordance with an embodiment of the present invention. The versatile device 100 of the present invention is configured to be worn by an authenticated user such that to encircle a part of the authenticated user's body. In an embodiment, the versatile device 100 is implemented as a wristwatch 100 as shown in FIG. 1. Alternatively, the versatile device 100 may be implemented as any finger, hand, arm, foot, leg, waist, wrist, or other body worn item, such as a bracelet or armband. It should be understood that the wristwatch 100 may have other configurations.

In particular, the wristwatch 100 includes electronic circuitry 50 to host one or more applications, secure authentication/identification data, and transaction data, and to also provide authentication to validate use and possession of the wristwatch 100 by a legitimate user by executing a use-based context security validation scheme. The wristwatch 100 is configured to facilitate a wireless transaction for an authenticated user and is configured to be worn by the authenticated user such that to encircle a part of the authenticated user, such as the authenticated user's wrist. The wireless transaction can be of any type (e.g., credit card type, debit card type, access control type, etc.). Moreover, the wristwatch 100 includes a validation mechanism for controlling use of the wristwatch 100 based on whether the authenticated user continues to wear the wristwatch 100 after initiating use of the wristwatch 100. The validation mechanism includes a transmitting element 40, a receiving element 30, a data channel 80, and a monitoring component (integrated in the electronic circuitry 50) for monitoring the status of the data channel 80.

Moreover, the wristwatch 100 executes a context security validation scheme, where authenticated use is determined not only by possession of the wristwatch 100, but also by its operational context. The operational context will allow the wristwatch 100 to accept or deny any external service interaction via a wireless link, based on whether the wristwatch 100 is in an active/secure status state or in an inactive state. In particular, the wristwatch 100 includes a data channel 80 integrated within the first and second straps 10 and 20 of the wristwatch 100 itself enabling validation of whether the wristwatch 100 is being worn by the authenticated user that initiated use of the wristwatch 100. Removal of the wristwatch 100 will invalidate its context security and place the wristwatch 100 in an inactive state, disabling all external interaction via a wireless link.

The context security validation executed by the wristwatch 100 enables valid user authentication and access to services or transactions via a wireless link, which may otherwise be obtained by non-authenticated individuals who obtained the wristwatch by devious means or by accident.

The concept of a secure device state provides additional security and theft redundancy as the wristwatch 100 acts as a host for applications and secure data and no longer solely depends on possession to maintain security. The security is obtained by a combination of the authenticated user wearing the wristwatch 100 and initializing its operation. Therefore, removing the wristwatch 100 will also disable its operational capabilities, thus reducing its value to others.

As illustrated in FIG. 1, the wristwatch body 90 acts as the main functional section. The wristwatch body 90 provides time and date functions via the watchface 60. Moreover, the wristwatch body 90 provides secure data storage capability, wireless transaction capability, and an encryption engine for the validation mechanism. Moreover, the wristwatch 100 includes a data channel 80 integrated within the first and second straps 10 and 20 of the wristwatch 100 itself enabling validation of whether the wristwatch 100 is being worn by the authenticated user that initiated use of the wristwatch 100. The wristwatch body 90 includes an embedded electronics subsystem 50, a transmitting element 40 for transmitting data through the data channel 80, a receiving element 30 for receiving the data transmitted through the data channel 80, and optional biosensors 70 for sensing whether the authenticated user is wearing the wristwatch 100. A successful transmission of the data between the transmitting element 40 and the receiving element 30 indicates that the wristwatch 100 is being worn by the authenticated user. Moreover, the data channel 80 is configured to be rendered inoperable if the authenticated user discontinues wearing the wristwatch 100. Specifically, the data transmitted by the transmitting element 40 is transmitted periodically and is time-varying to avoid unauthorized interference with the monitoring of the integrity and status of the data channel 80. In particular, the encryption engine facilitates secure transmission of the data through the data channel 80. In addition, the wristwatch 100 includes a clasp or strap connection mechanism 85.

Figure 2:
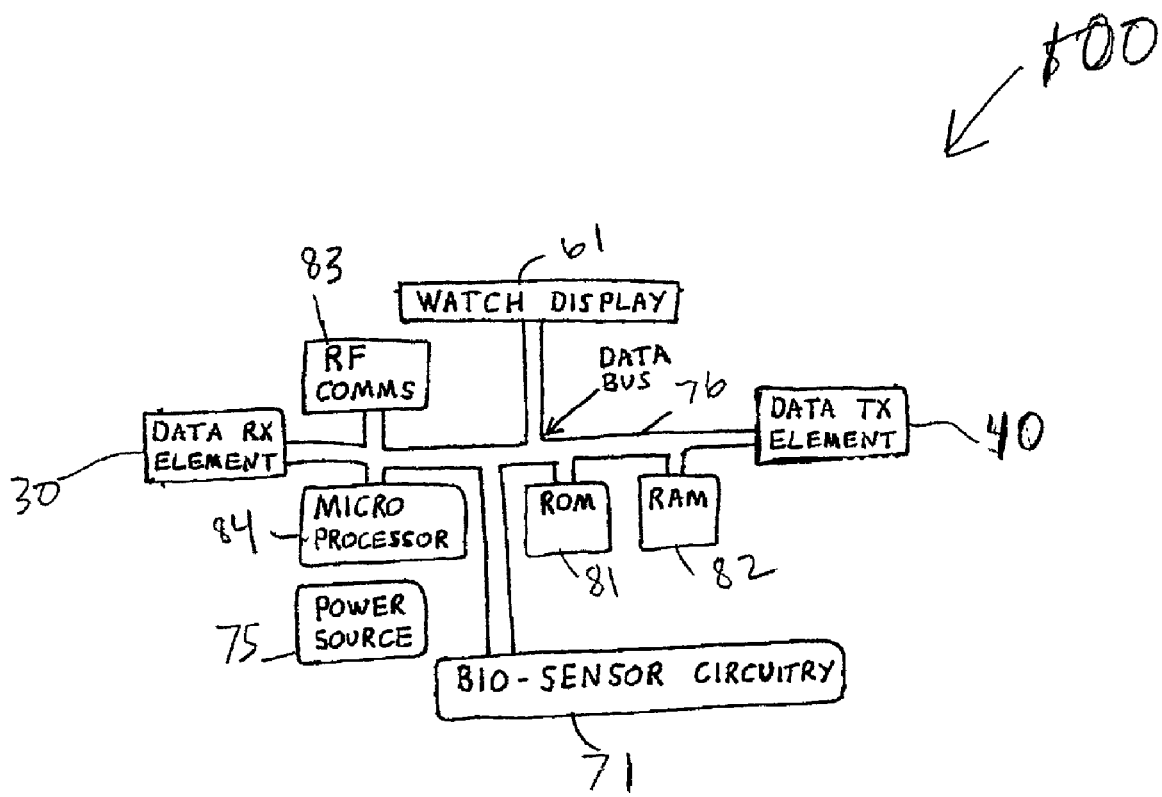
FIG. 2 illustrates a block diagram of electronic components of the wristwatch of FIG. 1.

FIG. 2 illustrates a block diagram of electronic components of the wristwatch 100 of FIG. 1. The wristwatch 100 includes a microprocessor 84 for monitoring the status of the data channel 80 and executing the context security validation scheme, a read only memory (ROM) 81, a random access memory (RAM) 82, a radio frequency (RF) interface 83, an interface 61 to the watch display 60, an internal power source 75, the transmitting (TX) element 40, the receiving (RX) element 30, a data bus 76, and circuits 71 to process the biosensor 70 output signals.

The wristwatch 100 is capable of providing a low cost and robust authentication solution by ensuring the integrity of the data channel 80 integrated into the first and second straps 10 and 20. Security can be enhanced by using the optional biosensor subsystem 70 and 71, providing the capability to detect the presence or absence of the authenticated user's body using biometric measurement techniques (e.g., skin temperature, light reflection, humidity), in addition to the integrity of the data channel 80 itself.

Figure 3:
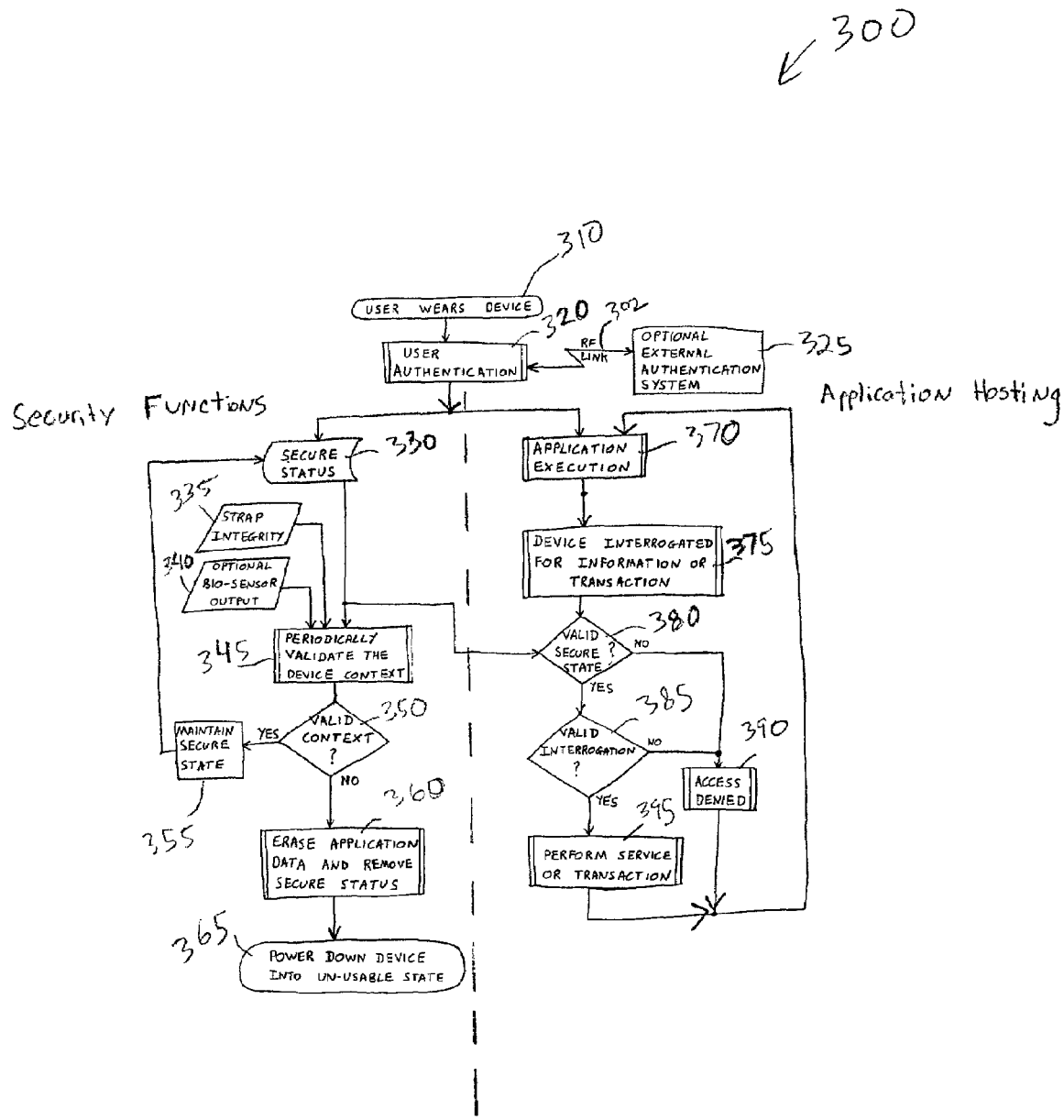
FIG. 3 illustrates a flow chart showing a method of securely operating the wristwatch of FIG. 1 in accordance with an embodiment of the present invention.

FIG. 3 illustrates a flow chart showing a method 300 of securely operating the wristwatch 100 of FIG. 1 in accordance with an embodiment of the present invention. Reference is made to FIGS. 1 and 2.

At Block 310, a user wears the wristwatch 100. Moreover, at Block 320, the user goes through a security initialization procedure to authenticate the user prior to allowing the user general operational use of the wristwatch's 100 application hosting functionality to facilitate a variety of wireless transactions for the authenticated user. The initialization procedure may be a simple wristwatch-based operation (e.g. entering a PIN number on the wristwatch itself) or a more complex security procedure involving an external security system at Block 325 (e.g. an external device with retina scanning hardware could be used to provide unique user verification, which is conveyed to the wristwatch 100 via the encrypted RF data communications link 302). Whatever the chosen initialization method, its task is to activate authenticated use of the wristwatch 100 by validating both the user and the data channel 80 integrated into the straps of the wristwatch 100. If the optional bio-sensing sub system 70 is used, the initialization process will also validate the presence of the user's body.

Once the user is authenticated, the wristwatch 100 enters an active/secure status state (at Block 330) and starts execution (at Block 370) of one or more applications, which are configured to facilitate wireless transactions and services. The wireless transaction and services can be of any type (e.g., credit card type, debit card type, access control type, etc.).

When the wristwatch 100 is interrogated by an external device at Block 375 to request information or to initiate a wireless transaction supported by a particular application hosted by the wristwatch 100, the particular application checks at Block 380 whether the wristwatch 100 is operating in the active/secure status state. If the wristwatch 100 is not operating in the active/secure status state, the particular application denies the user access to the particular application at Block 390. Otherwise, the particular application then checks at Block 385, the validity of the interrogation (e.g., has the user subscribed to the particular service, has the user paid the bill for the particular service). If the interrogation is not valid, the particular application denies the user access to the services offered by the particular application at Block 390. Otherwise, at Block 395, the particular application performs the desired service or transaction supported by the particular application.

At Blocks 335, 340, 345, 350, and 355, the integrity of the data channel 80 integrated into the straps is monitored. In particular, at periodic intervals, data is transmitted through the data channel 80 to validate the active/secure status state of the wristwatch 100. By transmitting and receiving a time varying encrypted data packet, the data channel 80 becomes more secure to attack or eaves dropping. The validation process uses its own data for transmission through the data channel 80, independent from the hosted applications or secure data stored in the wristwatch 100.

If a change in the active/secure status state is detected at Block 350 because the data channel has become inoperable indicating the authenticated user has removed the wristwatch 100, the wristwatch 100 erases (at Block 360) its active/secure status state and application data and then switches (at Block 365) to an inactive state or off. Once switched off, others cannot use the wristwatch 100 to execute services or transactions. Once switched off, the wristwatch 100 can only be re-activated by the user after wearing the wristwatch 100 and re-performing the initialization procedure described above. The optional bio-sensing subsystem (at Block 340) provides an extra level of security by determining the user's presence as a supplement to the monitoring of the status and integrity of the data channel 80. Abnormal changes detected by the biosensors will result in the performance of the operations in Blocks 360 and 365 as described above.

Figure 4:
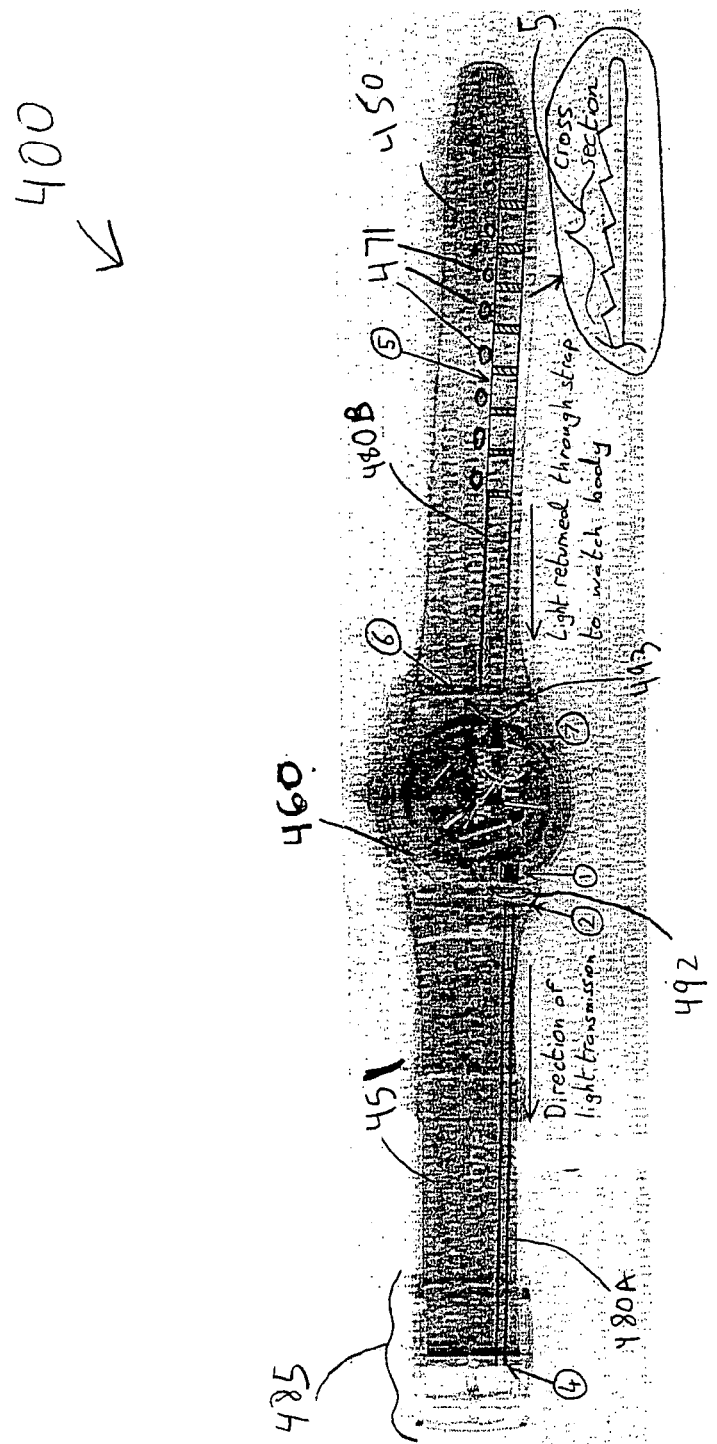
FIG. 4 illustrates a wristwatch in accordance with another embodiment of the present invention, showing an optical data channel.

FIG. 4 illustrates a wristwatch 400 in accordance with another embodiment of the present invention, showing an optical data channel 480A and 480B. The wristwatch 400 includes a first and a second plastic straps 450 and 451 and a buckle fastener 485. In an embodiment, the buckle fastener 485 is typical of those used on most low cost watches. Each strap 454 and 450 is manufactured so that it has an integrated optical light path 480A and 480B. The optical light paths 480A and 480B form the optical data channel of the wristwatch 400. This may be achieved by embedding an optical fiber in each strap. Alternatively, this may be achieved by manufacturing each strap from materials that possess appropriate optical properties.

Figure 5:
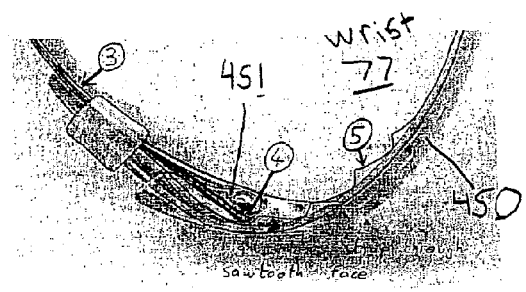
FIG. 5 illustrates operation of the optical data channel of the wristwatch of FIG. 4.
Figure 6:
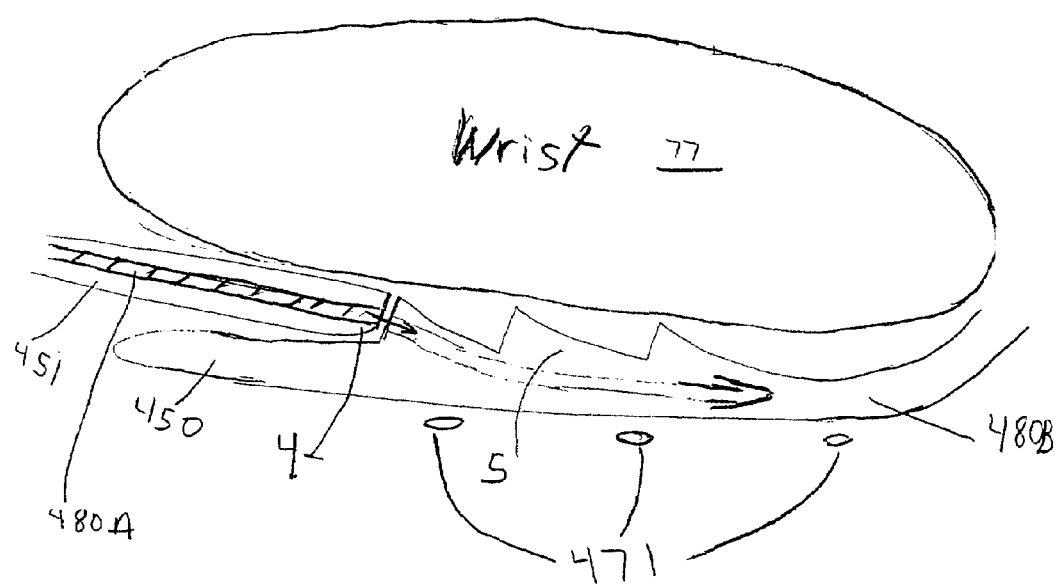
FIG. 6 illustrates operation of the optical data channel of the wristwatch of FIG. 4 in greater detail.

FIGS. 5 and 6 illustrate operation of the optical data channel 480A and 480B of the wristwatch of FIG. 4 in greater detail. The location of the user's wrist 77 is also shown. A light-transmitting element 1 transmits light into the fixed length strap 451 at its hinge 2 with the watch body 460. The curvature of the watch body 460 and the strap hinge mechanism 2 provide a lens 492 to focus the light into the optical light path 480A of the strap 451. Once in the strap 451, the light is refracted and guided to leave the strap 451 at an angle above the buckle connection 4, directing the light into the other variable length strap 450.

Continuing with FIGS. 4, 5, and 6, the light then enters the variable length strap 450 at one of a number of fixed points, determined by the positioning of the variable length strap 450, i.e. which hole is used to clasp the buckle 485. The geometry of the variable length strap 450 includes a 'sawtooth' pattern 5 that coincides with the buckle hole locations 471. This feature minimizes the air gap and light path between the two straps 451 and 450, thus ensuring that the light enters the variable length strap 450 close to perpendicular, maximizing the transmitted light energy entering the variable length strap 450. The light within the variable length strap 450 is then directed to the second hinge mechanism 6, which again provides a lens 493 to focus the remaining light energy to a light receiving/detection element 7.

To ensure efficient light transfer into each strap 450 and 451 and to provide a sealed and guided link between the watch body 460 and the strap optics, the watch body 460, hinge mechanism 2 and 6 and the straps 450 and 451 could be manufactured as a single plastic section, thus making the watch body and straps part of the same optical path, minimizing the number of light interfaces to three, i.e., the transmit and receive elements 1 and 2 and the buckle connection 4.

To avoid unwanted external light interference, each strap 450 and 451 could be windowed, possibly polarized, to ensure that light can only enter or leave the straps at the desired locations. This would assist in both reducing the optical power loss and hence the overall system power requirement and to reduce the possibility of external interference. By periodically transmitting a time varying encrypted data packet through the optical data channel integrated into the straps that has no correlation with the wristwatch's identification or application data, any attempted external eaves dropping of the optical data channel will not influence the secure functionality of the wristwatch 400.

Figure 7:
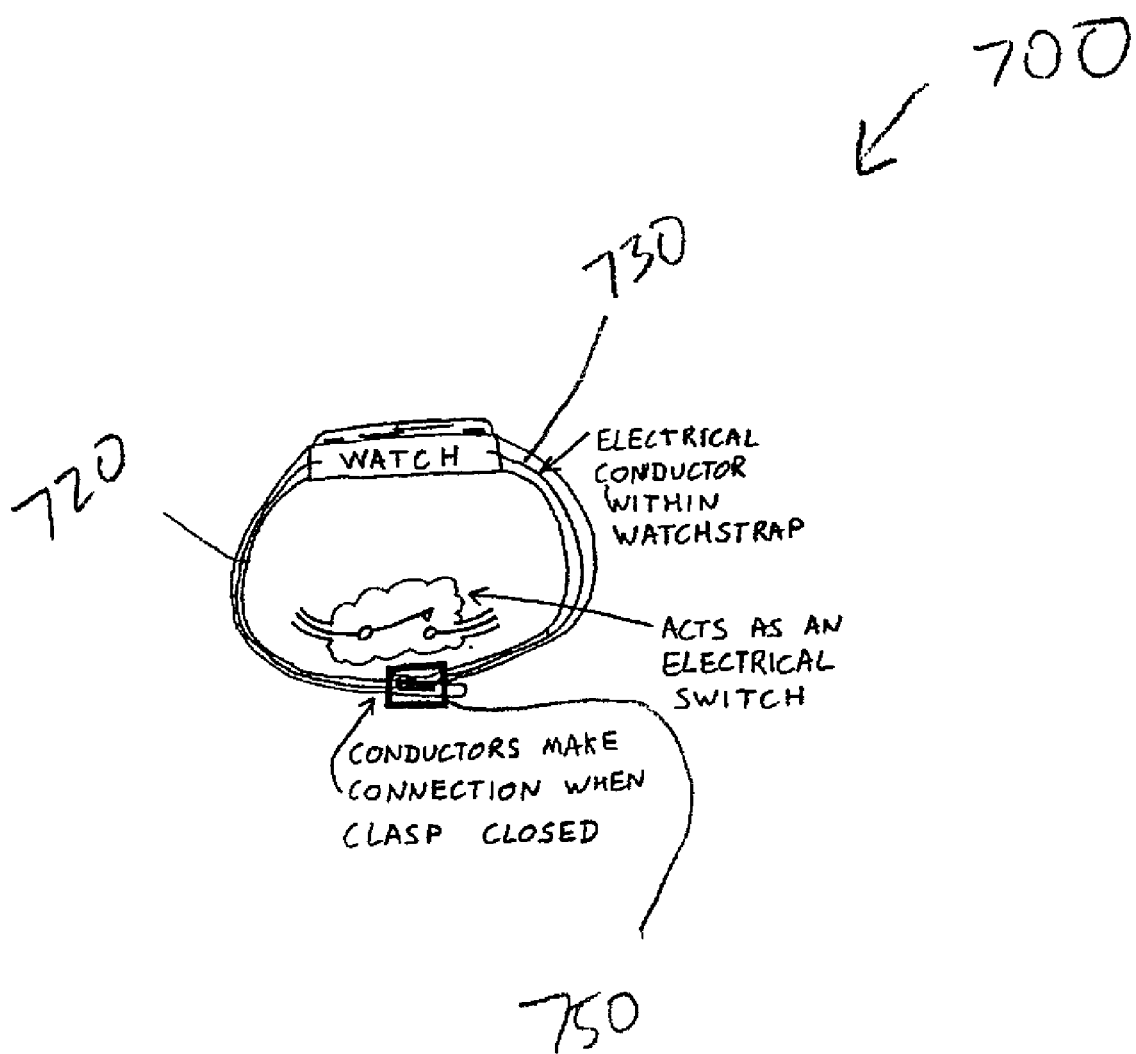
FIG. 7 illustrates a wristwatch in accordance with another embodiment of the present invention, showing a contacting electrical data channel.

FIG. 7 illustrates a wristwatch 700 in accordance with another embodiment of the present invention, showing a contacting electrical data channel. The wristwatch 700 includes two metal straps 720 and 730, whereas the contacting electrical data channel is integrated into the metal straps 720 and 730. One possible realization when using a metal strap is to use the clasp mechanism 750 as a switch, only allowing connection for the contacting electrical data channel when the clasp mechanism 750 is in the closed position. Although simple to realize, this type of design would be easy to eaves drop, vulnerable to an electrical by-pass and subject to switch contact or mechanical failure.

FIG. 8 illustrates a wristwatch 800 in accordance with another embodiment of the present invention, showing a non-contacting electrical data channel. An advantage offered by this wristwatch 800 is that the non-contacting electrical data channel integrated into the straps 810 and 820 used for data transmission can simultaneously provide information about the integrity of the straps 810 and 820 and their connection such as whether the authenticated user has loosen or tightened the straps 810 and 820. In particular, one or more electrical properties associated with the non-contacting electrical data channel can be monitored to determine a status of the non-contacting electrical data channel. Moreover, the non-contacting electrical data channel is more reliable and secure.

In this approach the two straps 810 and 820 become the electrical transmit and receive elements and are electrically connected to the watch body 830 and its internal circuitry. In particular, the non-contacting electrical sensor elements 840 are required to detect and validate that the straps 810 and 820 are fastened and facilitate the encrypted data transmission through the non-contacting electrical data channel. The manufacture of the wristwatch 800 could incorporate seamless rigid (watch electronics) and flexible (watchstrap) printed circuit board techniques, encased by the plastic watch body or other flexible non-conducting protective material.

FIG. 9 illustrates a wristwatch 900 in accordance with another embodiment of the present invention, showing a non-contacting electrical data channel formed by capacitive coupling. As illustrated in FIG. 9, over the anticipated area of overlap, capacitive plates 930 and 940 are embedded into each end of the two straps 910 and 920 to form a parallel plate capacitor with a deterministic capacitance based on the clasp position when worn. This will create a capacitive loop (or a non-contacting electrical data channel formed by capacitive coupling) through which the encrypted data can be transmitted, thus creating the non-contacting electrical data channel for secure data transmission and providing a means to monitor the status of the straps 910 and 920 and the non-contacting electrical data channel formed by capacitive coupling. In addition, periodic measurement of this capacitance will validate the integrity of the non-contacting electrical data channel itself. Abnormal changes to this measurement will result in the wristwatch erasing its active/secure status state. Appropriate geometric shielding of the plates to minimize stray losses and external interference may be required.

FIG. 10 illustrates a wristwatch 1000 in accordance with another embodiment of the present invention, showing a non-contacting electrical data channel formed by inductive coupling. As illustrated in FIG. 10, each of the straps 1010 and 1020 includes an inductive circuit element 1030 and 1040. When the two straps 1010 and 1020 are brought into close proximity with each other, the mutual inductance coupling between these two inductive elements 1030 and 1040 creates a non-contacting electrical data channel for secure data transmission and provides a means to monitor the status of the straps 1010 and 1020 and the non-contacting electrical data channel formed by inductive coupling, as described above. In addition, periodic measurement of mutual inductance will validate the integrity of the non-contacting electrical data channel itself. Abnormal changes to this measurement will result in the wristwatch erasing its active/secure status state. Appropriate geometric shielding of the inductive circuit element 1030 and 1040 to minimize stray losses and external interference may be required.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   a versatile device configured to facilitate a wireless transaction for an authenticated user and configured to be worn by said authenticated user such that to encircle a part of said authenticated user, wherein said versatile device comprises a bio-sensor for detecting the presence of said authenticated user; and
   a validation mechanism for controlling use of said versatile device based on whether said authenticated user continues to wear said versatile device after initiating use of said versatile device, wherein said validation mechanism monitors whether said authenticated user continues to wear said versatile device by transmitting at periodic intervals a data packet at one location of said versatile device and receiving said data packet at another location of said versatile device, said validation mechanism comprising:
   a transmitting element for transmitting said data packet;
   a receiving element for receiving said data packet; and
   a data channel spanning said transmitting element and said receiving element such that successful transmission of said data packet between said transmitting element and said receiving element indicates that said versatile device is being worn by said authenticated user, said data channel at least partially encircles a portion of said authenticated user, said data channel configured to be rendered inoperable if said authenticated user discontinues wearing said versatile device, and said versatile device may be re-activated by said authenticated user.

2. The apparatus of claim 1 wherein said data channel comprises an optical path.

3. The apparatus of claim 1 wherein said data channel is a contacting electrical data channel.

4. The apparatus of claim 1 wherein said data channel is a non-contacting electrical data channel formed by capacitive coupling, wherein a capacitance value associated with said non-contacting electrical data channel can be monitored to determine a status of said non-contacting electrical data channel.

5. The apparatus of claim 1 wherein said data channel is a non-contacting electrical data channel formed by inductive coupling, wherein a mutual inductance value associated with said non-contacting electrical data channel can be monitored to determine a status of said non-contacting electrical data channel.

6. A versatile device comprising:
   a wristwatch configured to facilitate a wireless transaction for an authenticated user and configured to be worn by said authenticated user such that to encircle a part of said authenticated user, said wristwatch including a validation mechanism for controlling use of said wristwatch based on whether said authenticated user continues to wear said wristwatch after initiating use of said wristwatch, wherein said wristwatch includes a bio-sensor for detecting the presence of said authenticated user, and wherein said validation mechanism monitors whether said authenticated user continues to wear said wristwatch by transmitting at periodic intervals an encrypted data packet at one location of said wristwatch and receiving said encrypted data packet at another location of said wristwatch.

7. The versatile device of claim 6 wherein said wristwatch includes a first strap and a second strap, wherein said validation mechanism includes a transmitting element for transmitting said encrypted data packet, a receiving element for receiving said encrypted data packet, and a data channel integrated into said first and second straps to span said transmitting element and said receiving element such that successful transmission of said encrypted data packet between said transmitting element and said receiving element indicates that said wristwatch is being worn by said authenticated user, and wherein said data channel is configured to be rendered inoperable if said authenticated user discontinues wearing said wristwatch.

8. The versatile device of claim 7 wherein said data channel comprises an optical path.

9. The versatile device of claim 7 wherein said data channel comprises an inductive circuit element.

10. The versatile device of claim 7 wherein said data channel comprises a capacitive plate.

11. The versatile device of claim 7 wherein said data channel is a non-contacting electrical data channel formed by capacitive coupling, wherein a capacitance value associated with said non-contacting electrical data channel can be monitored to determine a status of said non-contacting electrical data channel.

12. The versatile device of claim 7 wherein said data channel is a non-contacting electrical data channel formed by inductive coupling, wherein a mutual inductance value associated with said non-contacting electrical data channel can be monitored to determine a status of said non-contacting electrical data channel.

13. A method of securely operating a versatile device configured to facilitate a wireless transaction for a user and configured to be worn by said user such that to encircle a part of said user, comprising:
  wearing said versatile device;
  initiating an authentication process for said user;
  if said authentication process is successful, placing said versatile device in a secure status state and enabling said versatile device to facilitate said wireless transaction for said user;
  monitoring whether said user continues to wear said versatile device after initiating use of said versatile device by transmitting at periodic intervals a data packet at one location of said versatile device and receiving said data packet at another location of said versatile device;
  detecting a presence of an authenticated user by said versatile device, wherein said versatile device comprises a bio-sensor; and
  if said user discontinues wearing said versatile device, placing said versatile device in an inactive state and disabling said versatile device from facilitating said wireless transaction for said user, wherein said versatile device may be re-activated after wearing said versatile device and re-performing said initiating an authentication process for said user.

14. The method as recited in claim 13 wherein said monitoring includes:
  transmitting said data packet through a data channel of said versatile device, wherein said data channel at least partially encircles a portion of said user.

15. The method as recited in claim 14 wherein said data channel comprises an optical fiber.

16. The method as recited in claim 14 wherein said data channel is a non-contacting electrical data channel, wherein one or more electrical properties associated with said non-contacting electrical data channel can be monitored to determine a status of said non-contacting electrical data channel.

17. The method as recited in claim 14 wherein said data channel is a non-contacting electrical data channel formed by capacitive coupling, wherein a capacitance value associated with said non-contacting electrical data channel can be monitored to determine a status of said non-contacting electrical data channel.

18. The method as recited in claim 14 wherein said data channel is a non-contacting electrical data channel formed by inductive coupling, wherein a mutual inductance value associated with said non-contacting electrical data channel can be monitored to determine a status of said non-contacting electrical data channel.

19. The method as recited in claim 13 wherein said data packet is encrypted.

20. The method as recited in claim 13 wherein said versatile device comprises a wristwatch.

* * * * *